Sept. 16, 1924.

T. R. COOK

STORAGE BATTERY PLATE

Filed Aug. 10, 1920

1,508,776

2 Sheets-Sheet 1

Thomas R. Cook, INVENTOR.

BY

A. L. Vencill, ATTORNEY.

Sept. 16, 1924.

T. R. COOK

STORAGE BATTERY PLATE

Filed Aug. 10, 1920    2 Sheets-Sheet 2

1,508,776

Thomas R. Cook, INVENTOR.

BY

ATTORNEY.

Patented Sept. 16, 1924.

1,508,776

UNITED STATES PATENT OFFICE.

THOMAS R. COOK, OF PITTSBURGH, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE-BATTERY PLATE.

Application filed August 10, 1920. Serial No. 402,664.

*To all whom it may concern:*

Be it known that THOMAS R. COOK, a citizen of the United States, residing at Pittsburgh, in the county of Allegheny and State of Pennsylvania, has invented certain new and useful Improvements in Storage-Battery Plates, of which the following is a specification.

My invention relates to secondary or storage batteries, and particularly to the grids for the positive and negative plates which are included in such batteries.

I will describe one form of positive grid and one form of negative grid embodying my invention, and will then point out the novel features thereof in claims.

Figure 1:
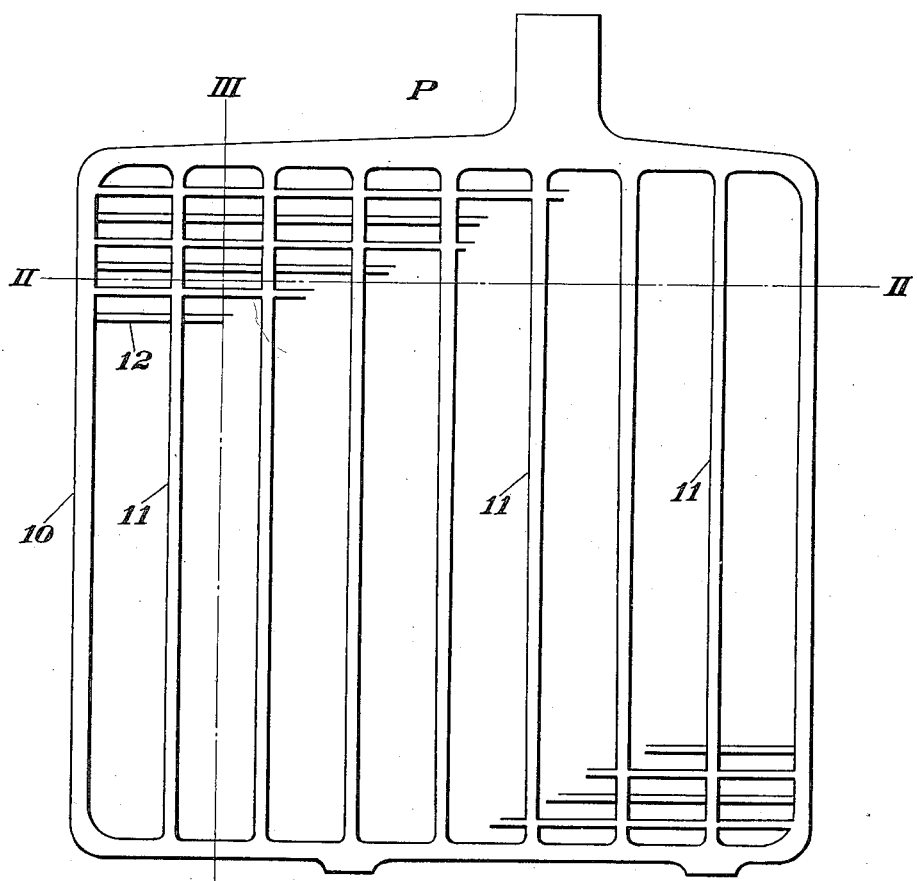
Figure 3:
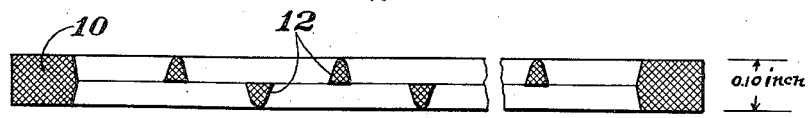
Figure 2:
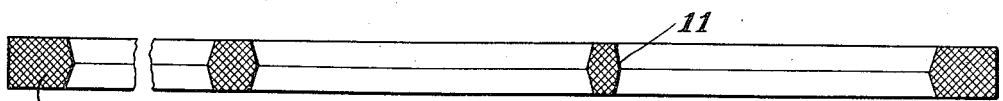
Figure 4:
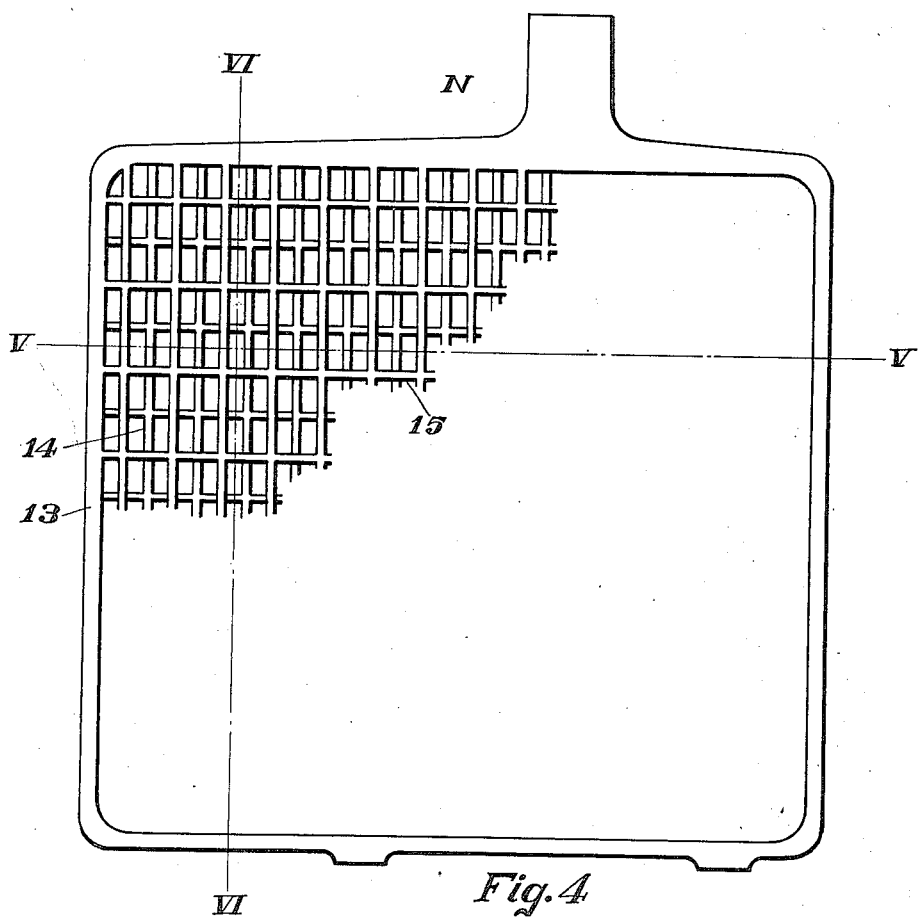
Figure 5:
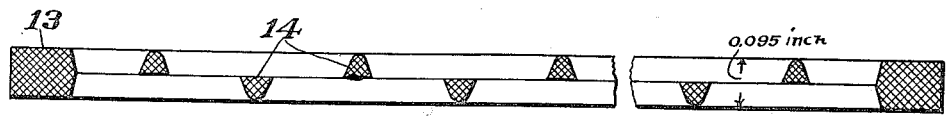

In the accompanying drawings, Fig. 1 is a view showing in front elevation one form of positive grid embodying my invention. Fig. 2 is a sectional view on the line II—II of Fig. 1 on an enlarged scale. Fig. 3 is a sectional view on the line III—III of Fig. 1 and also on an enlarged scale. Fig. 4 is a view showing in front elevation one form of negative grid embodying my invention. Fig. 5 is a sectional view on the line V—V of Fig. 4 on an enlarged scale, and Fig. 6 is a sectional view on the line VI—VI of Fig. 4 and also on an enlarged scale.

Similar reference characters refer to similar parts in each of the several views.

Referring first to Figs. 1, 2 and 3 the positive grid P comprises a substantially rectangular frame 10 provided with a plurality of heavy vertical ribs 11 and a plurality of smaller horizontal ribs 12. The vertical ribs 11 are equal in thickness to the frame 10, while each horizontal rib 12 is only half as thick as the frame and the vertical ribs. The horizontal ribs 12 are staggered in position as shown in Fig. 3, adjacent ribs lying on opposite sides of a plane passing through the middle of the grid.

Figure 6:
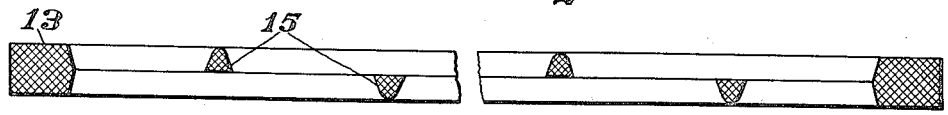

Referring now to Figs. 4, 5 and 6, the negative grid N comprises a rectangular frame 13 provided with vertical ribs 14 and horizontal ribs 15. Each of these ribs is half as thick as the frame 13. As shown in Fig. 5, the vertical ribs are staggered in position, adjacent ribs lying on opposite sides of a plane passing through the middle of the grid, and as shown in Fig. 6, the same thing is true of the horizontal ribs 15.

As will be apparent from the drawings, the amount of grid material in the positive grid is considerably greater than the amount of material in the negative grid N. The reason for this is that the positive grid is subjected to corrosion and to forces which tend to buckle the grid, whereas the negative grid is free from these influences. The positive grid, then, must have sufficient grid material to prevent the grid from being short lived due to corrosion, and this material must be properly distributed to give the grid the necessary stiffness to resist buckling. The negative grid, on the other hand, need contain only sufficient grid material to give the grid reasonable stiffness and the proper electrical conductivity. It is desirable, however, that the two grids should hold substantially the same amounts of active materials and to provide for this I make the positive grid thicker than the negative grid. I have found that for batteries of certain classes the thickness of the positive grid may be 0.100 inch, and the thickness of the negative grid 0.095 inch, these thicknesses bearing such relations to the other dimensions of the grids that the two grids will hold substantially the same amounts of active materials.

As for the negative grid N, the ribs 14 and 15 are so designed and disposed that the distance from the center of each small rectangle to the ribs forming such rectangle is as small as possible, consistent with the requirement that the grid must have a certain amount of rigidity. In this way I reduce to the minimum the distance which current must travel through the active material in each rectangle.

Although I have herein shown and described only one form of positive and negative grid embodying my invention, it is understood that various changes and modifications may be made therein within the scope of the appended claims without departing from the spirit and scope of my invention.

Having thus described my invention, what I claim is:

1. A storage battery comprising a positive grid having a relatively large amount of grid material, and a negative grid having a relatively small amount of grid material, said grids being constructed to hold substantially the same amounts of active material.

2. A storage battery comprising a positive grid having a relatively large amount of grid material, and a negative grid having a relatively small amount of grid material, the positive grid being thicker than the negative so that the two grids hold substantially the same amounts of active materials.

In testimony whereof I affix my signature in presence of two witnesses.

THOMAS R. COOK.

Witnesses:
A. HERMAN WEGNER,
E. Z. WEBER.